United States Patent
Black et al.

(10) Patent No.: US 6,928,556 B2
(45) Date of Patent: Aug. 9, 2005

(54) METHOD AND APPARATUS IN A DATA PROCESSING SYSTEM FOR MANAGING SITUATIONS FROM CORRELATED EVENTS

(75) Inventors: Steven C. Black, Round Rock, TX (US); Herve Debar, Caen (FR); John Michael Garrison, Austin, TX (US); RoseAnne Swart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 09/942,745

(22) Filed: Aug. 30, 2001

(65) Prior Publication Data

US 2003/0051184 A1 Mar. 13, 2003

(51) Int. Cl.[7] ............................................. G06L 11/30
(52) U.S. Cl. ......................... 713/201; 713/400; 714/4; 714/26
(58) Field of Search ................. 713/201, 400; 714/4, 26

(56) References Cited

U.S. PATENT DOCUMENTS

| | | | |
|---|---|---|---|
| 5,761,502 A | 6/1998 | Jacobs | 395/614 |
| 5,768,614 A | 6/1998 | Takagi et al. | 395/821 |
| 5,844,553 A | 12/1998 | Hao et al. | 345/329 |
| 5,987,514 A | 11/1999 | Rangarajan | 709/224 |
| 6,481,005 B1 * | 11/2002 | Crowley et al. | 717/100 |
| 6,505,245 B1 * | 1/2003 | North et al. | 709/223 |
| 6,513,129 B1 * | 1/2003 | Tentij et al. | 714/4 |

FOREIGN PATENT DOCUMENTS

| | | | |
|---|---|---|---|
| JP | 2000-99112 | 4/2000 | G05B/19/00 |
| JP | 2000-151605 | 5/2000 | H04L/12/24 |
| WO | WO 00/39676 | 7/2000 | G06F/9/44 |
| WO | WO 00/41112 | 7/2000 | G06F/17/60 |

OTHER PUBLICATIONS

IBM Technical Disclosure Bulletin, "Input/Output Event Analysis", vol. 40, No. 07, Jul. 1997.
IBM Research Disclosure 428126, "Keeping Track of DCE Audit Denial Events", Dec. 10, 1999.

* cited by examiner

Primary Examiner—A. Elamin
(74) Attorney, Agent, or Firm—Duke W. Yee; Jeffrey S. LaBaw

(57) ABSTRACT

A method, apparatus, and computer implemented instructions for handling a situation in a data processing system. In response to detecting a situation, an aging function is applied to the situation. Alerts regarding the situation based on the aging function are presented.

23 Claims, 4 Drawing Sheets

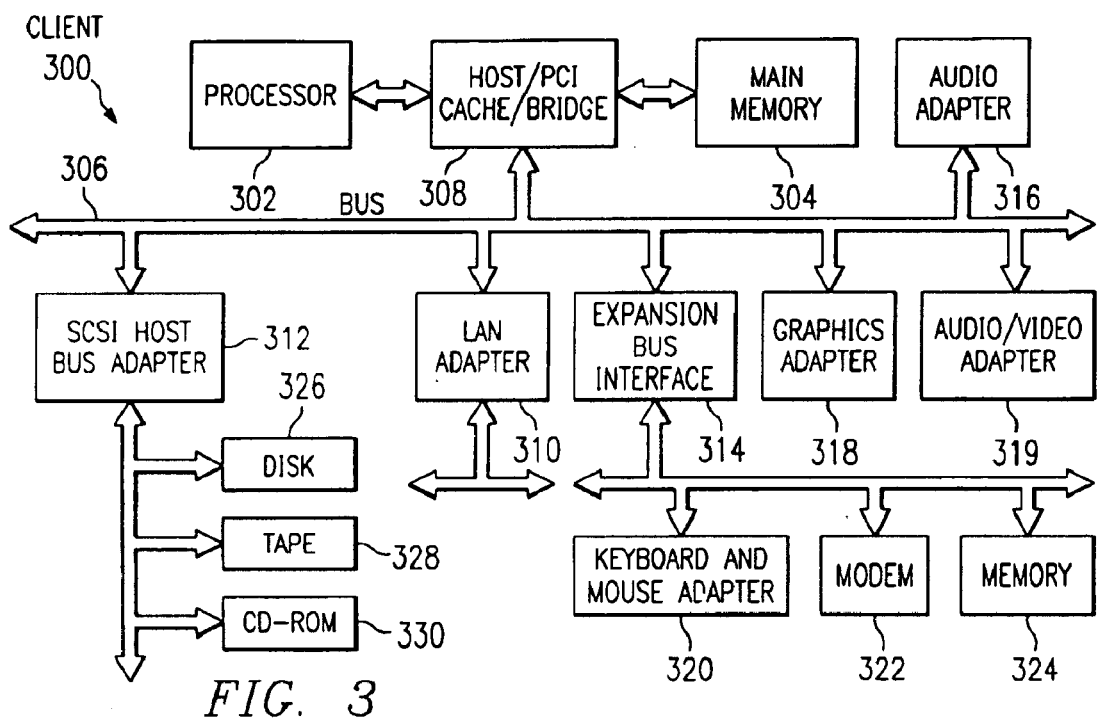
FIG. 3
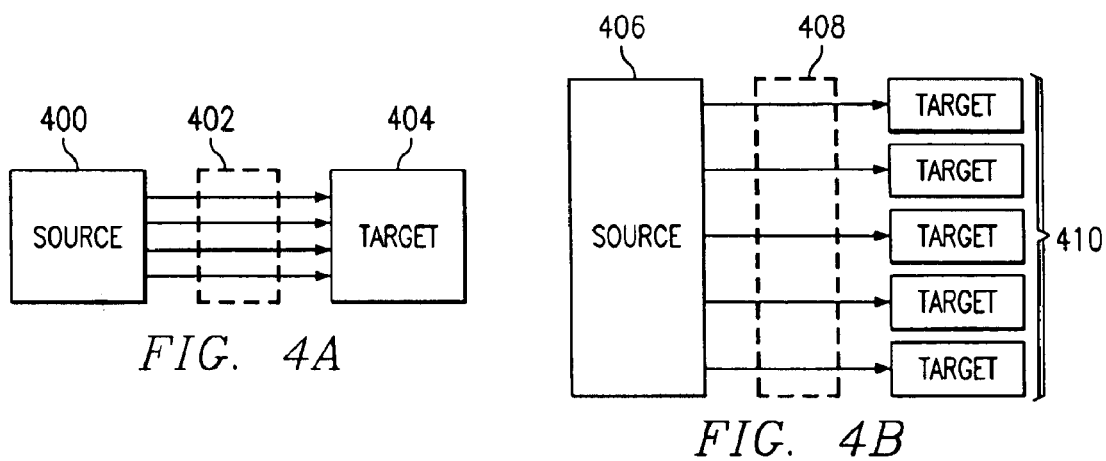
FIG. 4A
FIG. 4B
FIG. 4C

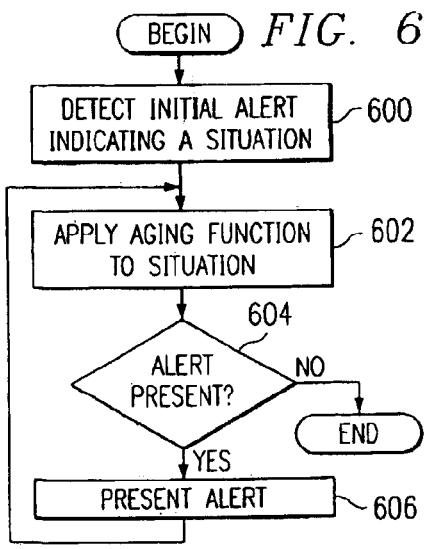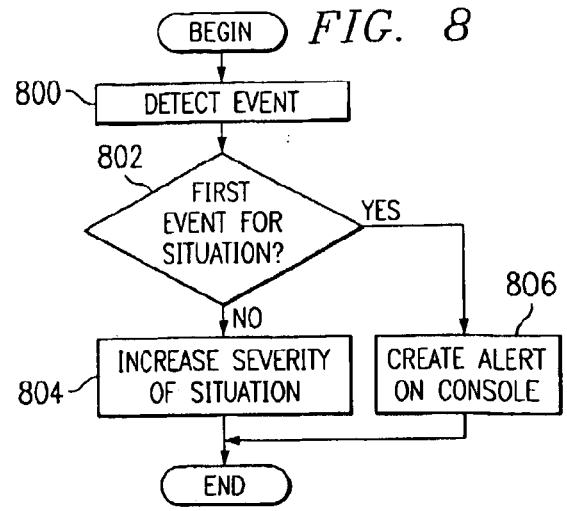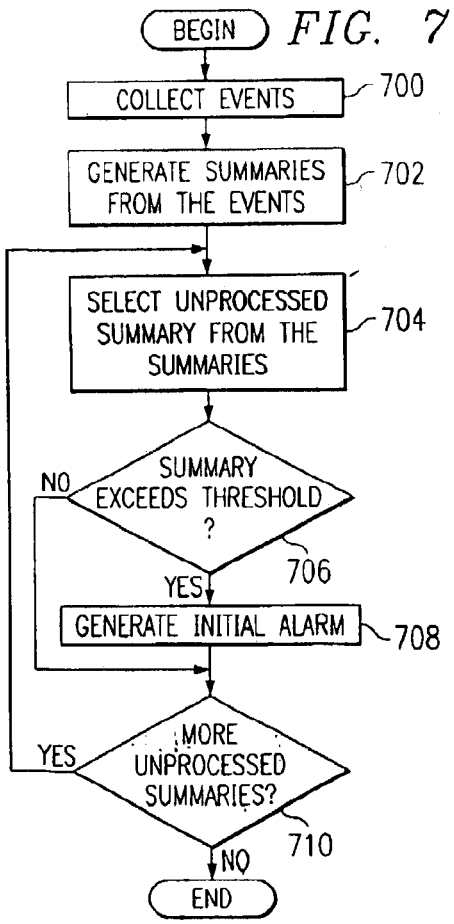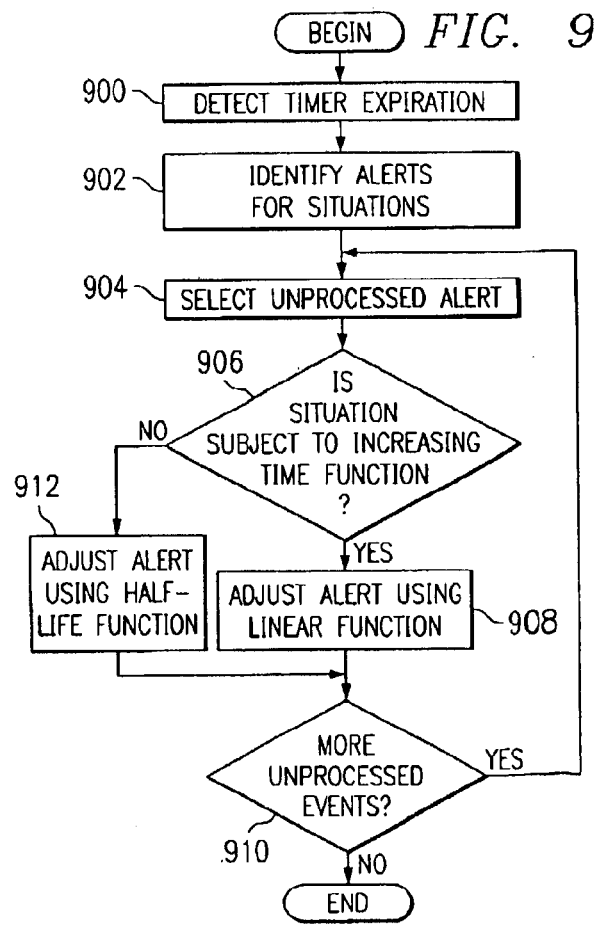

METHOD AND APPARATUS IN A DATA PROCESSING SYSTEM FOR MANAGING SITUATIONS FROM CORRELATED EVENTS

BACKGROUND OF THE INVENTION

1. Technical Field

The present invention relates generally to an improved data processing system, and in particular to a method and apparatus for managing alerts. Still more particularly, the present invention provides a method, apparatus, and computer implemented instructions for managing alerts from identified situations relating to a series of security violations.

2. Description of Related Art

Much of the progress in computer technology in recent years has centered around inter-computer communication. In many cases, networks of small-scale computers have been used in place of mainframe computers. Sometimes, it is less expensive and more efficient for users to share data among single-user workstations and small-scale servers than it is to share computing time on a single mainframe computer.

Increases in connectivity between computers, especially through the Internet, the world's largest and most interconnected computer network, are not without costs. Increased connectivity brings with it an increased likelihood of a security breach or other malevolent activity. Put another way, the more accessible computers become, the more they will be accessed.

It is thus imperative for organizations that rely on networks of computers to have effective security violation detection systems in place to prevent and remedy security compromises. In particular, where many system events that might be categorized as suspicious take place, it is important to be able to sort through a large amount of event data to determine what is actually taking place. When system events are simply "dumped" to a human administrator or user, it is difficult for the human administrator to sort through and make sense of the voluminous data.

After a detection of an attempt of an unauthorized access or other suspicious activity has occurred, an alert of the situation is typically displayed for an operator to see and process. Typically, the situation is presented in a static manner as an alert or event with the alert remaining on the operator's console until the alert is either manually closed or a preset time period elapses causing the alert to be closed out. In a dynamic environment with a large amount of activity, this type of alert handling may easily lead to an overwhelming number of alerts being displayed in which the alerts being displayed are difficult to display in terms of timeliness and relative importance.

Therefore, it would be advantageous to have an improved method and apparatus for handling alerts of situations.

SUMMARY OF THE INVENTION

The method of the present invention provides a method, apparatus, and computer implemented instructions for handling a situation in a data processing system. In response to detecting a situation, an aging function is applied to the situation. The manner in which alerts regarding the situation are presented is based on the aging function.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIGS. 4A–4C are diagrams illustrating a number of different scenarios in which attacks (or suspicious activity) directed at a network can occur in a preferred embodiment of the present invention;

FIG. 6 is a flowchart of a process used for processing an alert for a situation event in accordance with a preferred embodiment of the present invention;

FIG. 7 is a flowchart of a process used for generating an initial alert in accordance with a preferred embodiment of the present invention;

FIG. 8 is a flowchart of a process used for processing an event in accordance with a preferred embodiment of the present invention; and FIG. 9 is a flowchart of a process used for processing events for situations in accordance with a preferred embodiment of the present invention.

DETAILED DESCRIPTION OF THE PREFERRED EMBODIMENT

Figure 1:
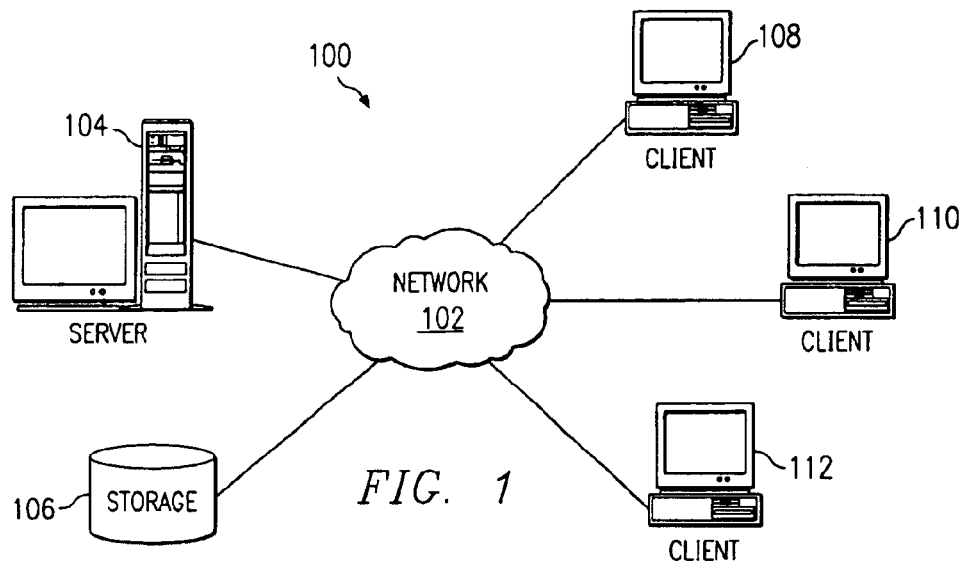
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
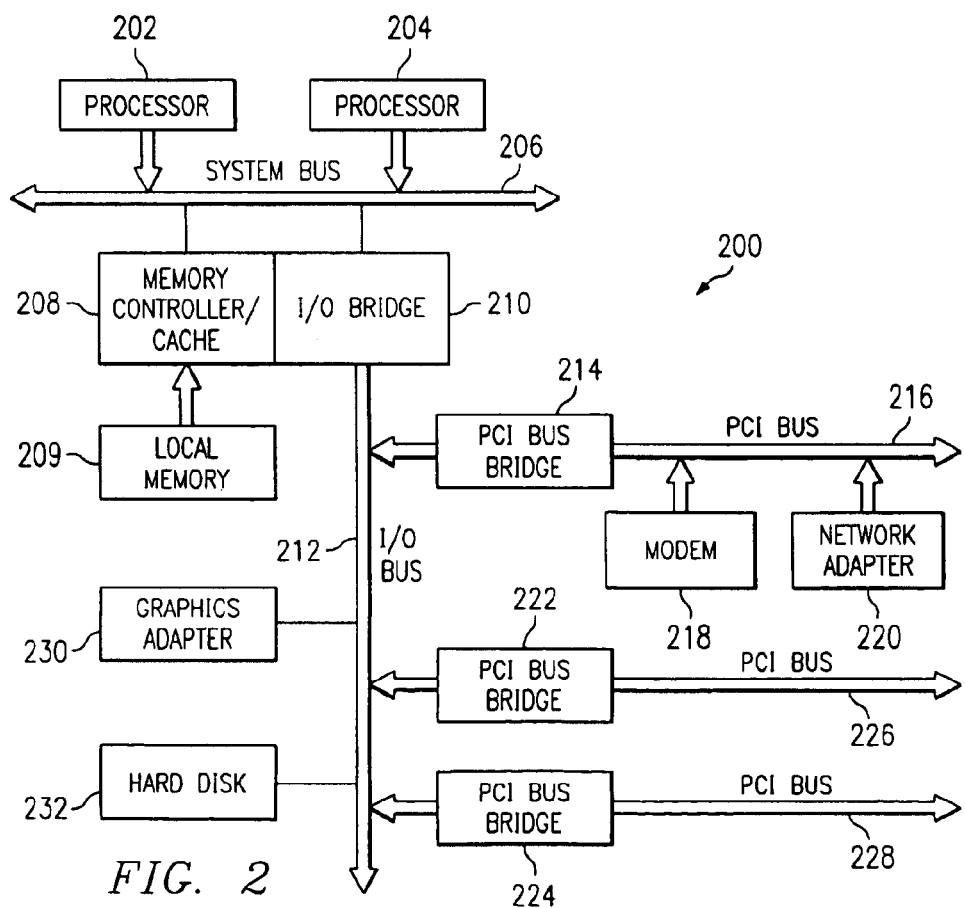
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, computer program product, and apparatus for reporting possible security violations and managing these possible security violations in a network data processing system containing several individual client or server computers. The present invention employs the use of an aging or decay function combined with user configurable threshold settings. With this mechanism, the severity of each alert may be dynamically determined and then displayed on a console or other interface.

Turning now to FIGS. 4A–4C, diagrams illustrating a number of different scenarios in which attacks (or suspicious activity) directed at a network can occur in a preferred embodiment of the present invention. Specifically, these figures illustrate a pattern of events or occurrences that may form a "situation". The events making up the situation also are referred to as "situation events". In these examples, a situation is a summary or a group of events in which the number of events exceed some threshold. The threshold at which a situation occurs, may vary depending on a correlation between the events and based on a severity for particular events involved. In the depicted examples, the events are those related to possible security violations or threats to components within a network data processing system.

In FIG. 4A, a situation where a single source computer 400 directs a number of attacks 402 toward a single target computer 404 is illustrated. Attacks 402 may be of a single type, such as in the case of a "denial of service attack," in which target computer 404 would be flooded with electronic mail or other network information from source computer 400. Alternatively, the attacks may be of different types, such as an attempt to break into a user's account on target computer 404, coupled with the transmission of a "Trojan horse" program via electronic mail. A "Trojan horse," much like the famous Trojan horse of classical antiquity, is a computer program that appears useful, but actually contains hidden code with a harmful effect.

Next, FIG. 4B depicts a situation in which a single source computer 406 directs attacks 408 at several target computers 410 within the network. FIG. 4C depicts another situation in which several source computers 412 direct attacks 414 at a single target computer 416.

One can more easily understand what is happening within the network when attacks are summarized. That is, if one is told that "Computer A is attacking computers on the network," one knows immediately to do something about "Computer A." If, on the other hand, if one reads a list of all of the possibly suspicious activity in the network, one may experience information overload; one may not realize that a problem exists with "Computer A." This is particularly true when "Computer A" attacks multiple computers, as in FIG. 4B. The present invention provides a way to summarize reports of suspicious activity in such a way that an administrator operating a computer system within the network can easily identify and correct security problems.

With situations, such as those illustrated in FIGS. 4A–4C, the alerts for these types of situations may be presented and dynamically changed to indicate the decreasing or increasing of the severity of the situation. The aging function used by the mechanism of the present invention may be any time dependent function appropriate to a given scenario. This function may increase or decrease the severity of the alert as time passes. Typical time dependent functions include functions, such as an exponential decay function with a given half-life, an exponentially increasing function, linearly decreasing functions, and a linearly increasing function. Other possibilities include a combination of two types of behavior, such as exponentially decreasing (or increasing) function for a set time period followed by a linearly decreasing (or increasing) function. Another useful possibility is to combine a linear or exponential function preceded or followed by time independent behavior, such as, for example, a straight line or curve followed or preceded by a flat line.

As an example, consider an application that deals with pattern or situation events, which have numerical severity level from 0 to 100 and a severity label, which may be assigned. Suppose that the severity label may take on these four values in order of increasing importance of the event: HARMLESS, MINOR, CRITICAL, SEVERE. The situation events are dynamic in that as new information arrives the numerical severity level of the events will change. Further, suppose that user-configurable threshold settings are provided. These settings allow for tuning the behavior of the system in terms of when a situation event is first created and how the situation changes dynamically from the moment the situation is created. Example threshold settings are shown in Table I below:

TABLE I

| Severity Label | Threshold | Meaning |
| --- | --- | --- |
| HARMLESS | 0 | A situation event of severity level between 0 and 20 |
| MINOR | 20 | A situation event of severity level between 20 and 40 |
| CRITICAL | 40 | A situation event of severity level between 40 and 80 |
| SEVERE | 80 | A situation event of severity level between 80 or greater |

Now when a situation is first created the severity level is set appropriately as determined by the thresholds. As new information arrives and the severity level increases or decreases, the severity label for the event changes accordingly as the various thresholds are crossed. When no new information arrives, however, the severity level and label for the event will continue to change according to a time dependent aging function.

For example, suppose that an exponential decay function is used with a half-life of two hours. When an situation reaches or is initially created with a severity level just below 80, the severity label will be CRITICAL. If no new information is arriving, the severity level will decrease over time. After two hours, the level reaches 40 and the label changes from CRITICAL to MINOR. After another two hours passes, the situation severity level reaches 20 and the severity label transitions from MINOR to HARMLESS. Variations on the scenario described above may be introduced to provide more complex and useful behavior. For example, a lower threshold setting may be used to determine when a situation event is destroyed or stopped. Additionally, when the situation event severity level drops below a value of 2, the event is deleted (or archived) and removed from the operator's display. Another variation may be to allow for a user-configurable setting to indicate when a situation event reaches a certain severity label or above, such as CRITICAL or higher. Although the numerical severity level may decrease, the severity label will remain at the highest value, which has been reached.

Figure 5A:
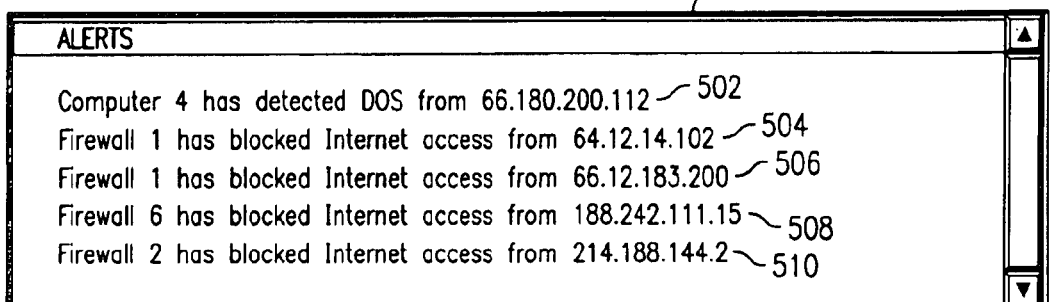
FIGS. 5A–5C are diagrams of situation events presented on a graphical user interface in accordance with a preferred embodiment of the present invention.
Figure 5B:
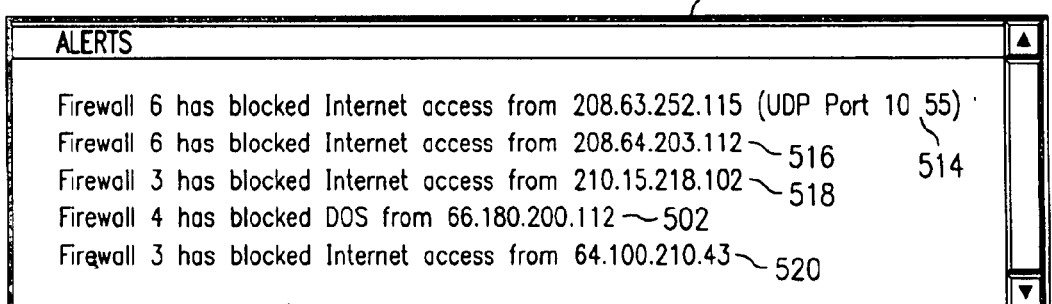
Figure 5C:
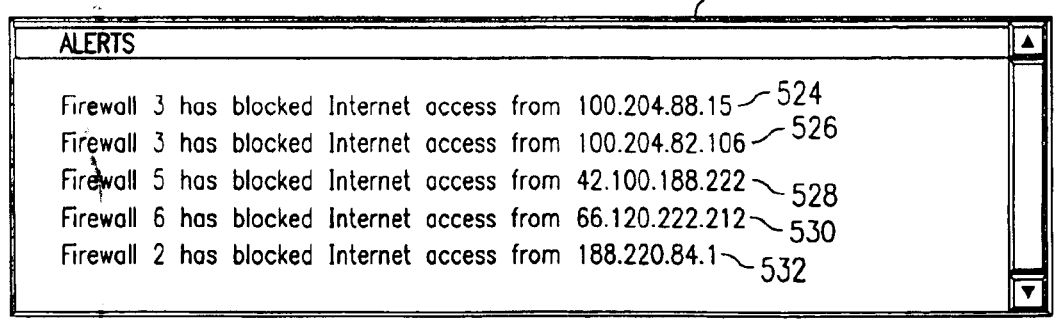

With reference now to FIGS. 5A–5C, diagrams of situation events presented on a graphical user interface are depicted in accordance with a preferred embodiment of the present invention. In these examples, dynamic changes to presentations of situation events are depicted as handled through applying an aging function according to the present invention.

In FIG. 5A, window 500 is an example of a window in a console for presenting alerts to an operator. Situation events 502, 504, 506, 508, and 510 are displayed within window 500. In this example, situation event 502 involves a "denial of service" (DoS), while situation events 504, 506, 508, and 510 indicate that Internet access to a system has been blocked. Situation event 502 is MINOR through its association with graphical indicator 512. In FIG. 5B, situation events 514, 516, 518, and 520 are displayed in addition to situation event 502. At this time, the severity of situation event 502 has been reduced to HARMLESS as indicated by its association with graphic indicator 522. The severity of the alert for situation event 502 reduces over the passage of time through an application of an aging function to the situation event.

In FIG. 5C, situation events 524, 526, 528, 530, and 532 are illustrated. Situation event 502 no longer appears within window 500. At this point in time, situation event 502 no longer appears based on the amount of time that has passed when an aging function is applied to this event.

In FIG. 5A, only a graphical indicator in the form of a bullet is illustrated for situation event 502 to more clearly describe the mechanism of the present invention. Typically, other events also may have associated graphical indicators. Further, the indicators may take other forms, such as, for example, blinking text, changing colors in text, or changing colors for a graphical indicator.

Turning next to FIG. 6, a flowchart of a process used for processing an alert for a situation event is depicted in accordance with a preferred embodiment of the present invention. The process illustrated in FIG. 6 may be implemented in a data processing system, such as data processing system 200 in FIG. 2.

The process begins by detecting an initial alert which indicates a situation (step 600). Next, an aging function is applied to the situation (step 602). The particular aging function applied to the situation depends on the particular situation detected. A determination is then made as to whether an alert is present (step 604). The determination is based on the result of applying the aging function to the situation. If an alert for a situation is present, the alert is presented on a display (step 606) with the process returning to step 602 as described above. Otherwise, the process terminates.

For example, a Web site is subjected to floods of network traffic with valid Web server requests that tend to overwhelm the Web server(s). In a denial of service (DoS) attack, the high volume of activity may make the Web site unusable or difficult to access for normal users. The events that form this situation may be requests originating from one or more sources.

As the DoS attack progresses over an extended period of time, a network-based sensor tracks the network activity and generates alerts to a central server. The alarm results in the creation of a situation on the console. Over time, the severity increases dramatically for the situation (or alarm) that is presented on the console because the problem is becoming more urgent. At some point, the situation may be deemed a CRITICAL situation. In this case, an action, such as sending e-mail to an administrator or paging the administrator may be initiated based on the severity of the situation crossing the CRITICAL threshold. However, once the DoS attack subsides, displaying a CRITICAL situation alert on the console indefinitely may be inappropriate. Continuing to display this alert clutters the console with events that may have already been handled or may become less interesting over time, since it reflects activity that happened in the past.

To address this problem, the mechanism of the present invention may apply an exponential, time-dependent decay function with a configured half-life to the situation. For example, if the situation reached a severity of 60 and then quiesced, a half-life of 2 hours would result in a severity level of 30 after 2 hours, then 15 after 4 hours and so on. At some point, the severity of the situation will reach a level below a minimum threshold and be removed from the console.

With reference now to FIG. 7, a flowchart of a process used for generating an initial alert is depicted in accordance with a preferred embodiment of the present invention. The process illustrated in FIG. 7 may be implemented in a data processing system, such as data processing system 200 in FIG. 2.

The process begins by collecting data on events (step 700). Next, summaries are generated from the events (step 702). An unprocessed summary is selected from the summaries for processing (step 704). A determination is then made as to whether the summary exceeds a threshold (step 706). If the summary exceeds the threshold, an initial alert is generated (step 708). Then a determination is made as to whether more unprocessed summaries are present (step 710). If more unprocessed summaries exist, the process returns to step 704 as described above. Otherwise, the process terminates. Turning back to step 706, if the summary does not exceed the threshold, the process proceeds to step 710 as described above. A more detailed description of grouping events into summaries and generating alerts is found in Presentation of Correlated Events as Situation Classes, application Ser. No. 09/931,301, filed even date hereof and incorporated herein by reference.

Turning next to FIG. 8, a flowchart of a process used for processing an event is depicted in accordance with a preferred embodiment of the present invention. The process illustrated in FIG. 8 may be implemented in a data processing system, such as data processing system 200 in FIG. 2.

The process begins by detecting an event (step 800). A determination is made as to whether the event is a first event for a situation (step 802). If the event is not a first event for the situation, the severity of the situation is increased (step 804) with the process terminating thereafter. If the event is a first event for the situation, an alert is created on a console (step 806) with the process terminating thereafter. This step is used to identify whether this particular event is the event that triggers the beginning of a situation. This event may follow other events, which may be part of the situation but insufficient to trigger the situation. This example applies a linear aging function to events for a situation as part of the process for increasing the severity of the alert for the situation. Any aging function may be used depending on the particular situation for which events are being processed.

With reference now to FIG. 9, a flowchart of a process used for processing events for situations is depicted in accordance with a preferred embodiment of the present invention. The process illustrated in FIG. 9 may be implemented in a data processing system, such as data processing system 200 in FIG. 2. The process illustrated in this figure may be used for evaluating all situations on a timed basis.

The process begins by detecting an expiration of a timer (step 900). Next, alerts are identified for situations (step 902). Then, an unprocessed alert for a situation is selected (step 904). Next, a determination is made as to whether the situation is subject to an increasing time function (step 906). If the situation is subject to an increasing time function, the alert is adjusted using a linear function (step 908). A determination is then made as to whether more unprocessed alerts for situations are present (step 910). If additional unprocessed alerts are present, the process returns to step 904 as described above. Otherwise the process terminates. Turning back to step 906, if the situation associated with the alert is not subject to an increasing time function, the alert is adjusted using a half-life function (step 912) with the process proceeding to step 910 as described above.

This depicted example illustrates a selection from two types of aging functions for purposes of illustrations. The mechanism of the present invention may select from other aging functions other than those shown in FIG. 9. For example, an exponentially increasing function may be used. As time passes, the severity increases at an exponential rate. This is indicative of an alert that demands immediate attention. Another function is a stepping function in which the severity decreases by a certain percentage for each unit of time. For example, the severity might decrease 25% after each 4 hour time period.

Thus, the present invention provides an improved method, apparatus, and computer implemented instructions for dynamically managing alerts for situations. The mechanism of the present invention applies an aging function identified by the alerts and adjusts the severity of the alert based on the results. The severity may increase or decrease depending on the passage of time and what events are detected for different situations. The mechanism of the present invention allows for a reduction in the number of alerts displayed to a user by removing alerts for situations that fall below some minimal threshold. The mechanism of the present invention may be applied to other types of situations other than those involving a denial of service.

For example, the mechanism of the present invention also may be applied to suspicious Web server requests. In this example, a relatively small number of requests are sent to a Web server by an individual. The requests are highly suspicious because these requests are designed to attempt to access information that should not be accessible. The fact that the suspicious requests are made is serious and results in a situation being created on the console. If the request is actually successful, for example, the sensor determines the user actually was able to access the information, then the severity of the situation is increased again. The question then arises as to how to handle the situation on the console if it does not receive attention. The recommendation in this case is to continue to increase the severity based on a linearly increasing function over time. The increase in severity is made because the hacker has exploited a weakness in the security apparatus of the Web site, and the problem becomes more severe the longer the weakness remains in place. As the severity increases over time, increasingly "vocal" mechanisms are invoked to bring the matter to the attention of an administrator. For example, these mechanisms may include e-mail, pager, and/or flashing red lights.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the events described in the examples are those related to possible security violations or threats to components within a network data processing system. Of course, the mechanism of the present invention may be applied to other types of events other than security related events. The mechanism of the present invention may be applied to resource events. For example, an event is received that a database server is running low on disk space. Another type is for 911 calls, such as those for emergencies requiring police or fire services. 911 calls are posted on a console and based on information collected on the call, the algorithm for managing severity on the console might be adjusted.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for handling a situation, the method comprising:

responsive to detecting a situation, selecting an aging function from a plurality of aging functions based on the detected situation, and applying the selected aging function to the situation; and presenting alerts regarding the situation based on the aging function.

2. The method of claim 1, wherein the aging function is an exponential decay function wherein a severity for the detected situation decreases exponentially with respect to time if any additional situations of a same type as the detected situation are not detected during such time.

3. The method of claim 1, wherein the aging function includes a user settable threshold.

4. The method of claim 1, wherein the aging function is an increasing time function wherein a severity for the detected situation increases with respect to time if any additional situations of a same type as the detected situation are not detected during such time.

5. The method of claim 4, wherein the increasing time function is one of a linear function or an exponential function.

6. The method of claim 1, wherein the aging function is a decreasing half-life function wherein a severity for the detected situation decreases by half after a given time window has elapsed if no additional situations of a same type as the detected situation are detected during such time window.

7. The method of claim 1, wherein the aging function is a combination of a linear function and an exponential function.

8. The method of claim 1, wherein the presenting step comprises:

displaying the alert on a console.

9. The method of claim 1, wherein the situation is one of a denial of server, a suspicious Web server request, or an unauthorized access of a server.

10. A method in a data processing system for handling a situation that includes a set of events, the method comprising:

monitoring for events;

responsive to detecting an event, which triggers the situation, applying an aging function to the situation, wherein the aging function is used to identify a severity of the situation; and presenting an alert for the situation based on the severity of the situation identified by the aging function, wherein a threshold at which the situation is triggered is based upon a correlation between the set of events.

11. The method of claim 10, wherein the aging function is selected from a plurality of aging functions based on the triggered situation.

12. The method of claim 11, wherein the correlation between the set of events is a severity of each of the events.

13. A data processing system comprising:
   a bus system;
   a communications unit connected to the bus system;
   a memory connected to the bus system, wherein the memory includes a set of instructions; and
   a processing unit connected to the bus system, wherein the processing unit executes the set of instructions to apply an aging function to the situation in response to detecting a situation, and present alerts regarding the situation based on the aging function, wherein the aging function is selected from a plurality of aging functions based on the detected situation.

14. A data processing system for handling a situation, the data processing system comprising:
   applying means, responsive to detecting a situation, for selecting an aging function from a plurality of aging functions based on the detected situation, and applying the selected aging function to the situation; and
   presenting means for presenting alerts regarding the situation based on the aging function.

15. The data processing system of claim 14, wherein the aging function is a an exponential decay function wherein a severity for the detected situation decreases exponentially with respect to time if any additional situations of a same type as the detected situation are not detected during such time.

16. The data processing system of claim 14, wherein the aging function includes a user settable threshold.

17. The data processing system of claim 14, wherein the aging function is an increasing time function wherein a severity for the detected situation increases with respect to time if any additional situations of a same type as the detected situation are not detected during such time.

18. The data processing system of claim 17, wherein the increasing time function is one of a linear function or an exponential function.

19. The data processing system of claim 14, wherein the aging function is a decreasing half-life function wherein a severity for the detected situation decreases by half after a given time window has elapsed if no additional situations of a same type as the detected situation are detected during such time window.

20. The data processing system of claim 14, wherein the aging function is a combination of a linear function and an exponential function.

21. The data processing system of claim 14, wherein the presenting means comprises:
   means for displaying the alert on a console.

22. The data processing system of claim 14, wherein the situation is one of a denial of server, a suspicious Web server request, or an unauthorized access of a server.

23. A computer program product in a computer readable medium for handling a situation, the computer program product comprising:
   first instructions, responsive to detecting a situation, for selecting an aging function from a plurality of aging functions based on the detected situation, and applying the selected aging function to the situation; and
   second instructions for presenting alerts regarding the situation based on the aging function.

* * * * *